United States Patent [19]
Fujimoto et al.

[11] Patent Number: 5,844,866
[45] Date of Patent: Dec. 1, 1998

[54] METHOD AND APPARATUS FOR CHECKING THE QUALITY OF CD-ROMS OR THE LIKE FOR READING THEM AT MATCHING SPEEDS

[75] Inventors: Shin Fujimoto, Iruma; Yukihiko Okada, Musashino, both of Japan

[73] Assignee: Teac Corporation, Tokyo, Japan

[21] Appl. No.: 890,924

[22] Filed: Jul. 10, 1997

[30] Foreign Application Priority Data

Jul. 17, 1996 [JP] Japan ................................. 8-207970
Nov. 25, 1996 [JP] Japan ................................. 8-330257

[51] Int. Cl.[6] ........................................... G11B 7/00
[52] U.S. Cl. ................................. 369/50; 369/52
[58] Field of Search ..................... 369/50, 54, 44.13, 369/44.26, 44.32, 47, 48

[56] References Cited

U.S. PATENT DOCUMENTS 5,384,761   1/1995   Hashimoto ............................. 369/50
5,479,389  12/1995   Ann ........................................ 369/50
5,701,284   6/1995   Lee ......................................... 369/50

*Primary Examiner*—Nabil Hindi
*Attorney, Agent, or Firm*—Woodcock Washburn Kurtz Mackiewicz & Norris LLP

[57] ABSTRACT

CD-ROMS of more or less poor quality, such as those having eccentric center holes or uneven weight distributions circumferentially, tend to overload tracking and focusing servos and hence to invite read errors and retries. Each disk on being loaded into the disk drive is therefore checked as to its eccentricity and wobbling preparatory to reading. The disk is set into rotation at a predetermined speed of, typically, eight times the standard audio CD speed. Disk eccentricity is checked by counting the pulses produced by the transducer as the spot of the read beam crosses the track turns, the tracking servo being cut off for this check. The greater the number of pulse generated during a complete disk revolution, the more eccentric is the disk. Wobble check is done by measuring the maximum amplitude of a focusing servo signal being applied to a focusing actuator coil. The disk is read at eight times the standard audio CD speed if it clears both checks, and at four times the standard audio CD speed if it fails to clear either check.

14 Claims, 6 Drawing Sheets

METHOD AND APPARATUS FOR CHECKING THE QUALITY OF CD-ROMS OR THE LIKE FOR READING THEM AT MATCHING SPEEDS

BACKGROUND OF THE INVENTION

This invention relates to the recovery of data from rotating data storage disks such as, typically, compact disks (CDs) used as read-only memories (ROMs) in computer systems. More specifically, the invention concerns how to determine optimum speeds of rotation for CD-ROMs or like data storage disks of varying physical qualities for error-free, and hence speedier, reading thereof.

Although originally developed for consumer audio reproduction in place of analog phonograph records, CDs have now found widespread commercial acceptance as compact, high-speed, large-capacity ROMs for computers. The only difference of CD-ROMs from audio CDs is that the CD-ROMS are driven at speeds up to eight times as high as the standard audio CD speed (1.2–1.4 meters per second).

There have been problems left unsolved in use of CD-ROMs with high-speed CD-ROM drives in computer systems. CD-ROMs are presently being made under the same design specifications and manufacturing standards as low-speed audio CDs. Inevitably, therefore, a substantial percentage of CD-ROMs on the market are not of truly satisfactory quality for use as high-speed computer data storage media. Some have their center holes cut eccentrically; others have an uneven weight distribution circumferentially. When driven at a speed as high as, say, eight times the standard audio CD speed, such eccentric disks are very likely to overload the tracking servo of the CD-ROM drive whereby the radial position of the beam spot on the disk is maintained in alignment with the spiral data track. The overloading of the tracking servo may result in the overheating of the voice-coil actuator for tracking control, in the degradation of its performance and, in the worst case, in the burning of the actuator coil.

Such low-grade disks are also very easy to wobble when driven at high speed. Disk wobbling may go so far as to overload the beam focusing servo of the CD-ROM drive, again resulting in the overheating of the focusing actuator of voice-coil construction, in the degradation of its performance and, in the worst case, in the burning of the focusing actuator coil. The malfunctioning of both tracking and focusing servos is very undesirable because of ensuing read errors and retries, which is very time-consuming and so runs counter to the objective of high speed data recovery for which CD-ROMs are intended.

The wobbling of low grade disks can give rise to additional inconveniences. A wobbling disk may cause vibration of the complete CD-ROM drive and, in consequence, of the hard disk drive (HDD) in particular which is currently being preferentially built into the computer system along with the CD-ROM drive. The vibration of the HDD is even more undesirable because it may invite both read and write errors, to the detriment of the reliability of the complete computer system. Even if not so excessive as to cause read and write errors, the vibration of the CD-ROM drive certainly gives a shoddy image to the user or to prospective buyers.

It might be contemplated that all such troubles and inconveniences would be avoidable if only high quality CD-ROMs, altogether free from the physical defects pointed out earlier, were used. CD-ROM drive manufacturers cannot, and should not, expect their products to be used only that way, since in the current state of affairs the existence of poor quality CD-ROMs must be more or less taken for granted.

SUMMARY OF THE INVENTION

The present invention has it as an object to enable speedy data recovery from CD-ROMs or other data storage disks of more or less low quality without any such troubles and inconveniences as have been encountered heretofore.

Another object of the invention is to recover data from disks of varying physical qualities at the highest possible speed suiting each particular disk without causing read errors or retries.

Still another object of the invention is to make utmost use of the preexisting parts and components of CD-ROM drives or like apparatus in order that the inventive concepts may be carried out in such apparatus without any substantial alteration in construction.

Briefly summarized in one aspect thereof, the invention provides what may be termed a disk check method, suitable for implementation in an apparatus for data recovery from rotating data storage disks of varying physical qualities. The disk check method is such that whether at least either of the eccentricity and wobbling of the disk is more than a prescribed limit or not while the disk is in rotation at a first predetermined speed. The disk is read at the first predetermined speed if said at least either of the eccentricity and wobbling of the disk is found to be not more than the prescribed limit, and at a second predetermined speed, which is less than the first predetermined speed, if said at least either of the eccentricity and wobbling of the disk is found to be more than the prescribed limit.

It should be understood that the term "speed" as used herein and in the claims appended hereto should be construed broadly, as data storage disks may be driven at either CLV or CAV in the practice of this invention. Thus the phase "predetermined speed" should be taken to mean "predetermined linear velocity" when the invention is applied to CD-ROMs or other CLV disks, and "predetermined angular velocity" when the invention is applied to CAV disks.

Disks that have cleared both eccentricity check and wobble check may be classified as good quality disks, and those which have failed to clear at least either of the checks as poor quality disks. The good quality disks are readable at, say, eight times the standard audio CD speed without trouble. The poor quality disks should be read at a lower speed of, say, four times the standard audio CD speed. Driven at this reduced speed, the poor quality disks will wobble or otherwise vibrate less and so cause less read errors and retries, thereby affording speedier reading. They will also impose less loads on the tracking and focusing actuator coils.

It might be feared that read errors were averted at the sacrifice of disk speed. Such fears are unjustified. Experiment has proved that the errorless reading of poor quality disks at the reduced speed demands far less periods of time than higher speed reading of such disks which necessarily involves read errors and retries. The advantages of such reduced speed data recovery from poor quality disks will be even better appreciated by taking into consideration all the aforementioned difficulties accruing from the high speed reading of these disks.

According to a further feature of the present invention, the read speed that has been determined as above for each disk loaded into the apparatus is held until that disk is unloaded therefrom. Therefore, no matter how many times the disk is set into and out of rotation, the disk will be read at the same appropriate speed as along as it stays loaded in the apparatus.

The reduced speed driving of poor quality disks brings about an additional advantage of less vibration. In a computer system incorporating both CD-ROM drive and HDD the less vibration of the CD-ROM drive is very important because of the correspondingly less vibration of the HDD, which will therefore suffer less read and write errors.

According to a more specific aspect of the invention, disk eccentricity is measured by cutting off a tracking servo and counting pulses produced by a transducer, or optical pickup, per unit length of time, the transducer producing each such pulse each time the spot of the read beam on the disk crosses a track turn. The greater the pulse number, the more eccentric is the disk. Also the wobbling of the disk is measured by detecting the maximum magnitude, during a unit length of time, of a focusing servo signal being applied to a focusing actuator for keeping the beam focused on the disk. The greater the magnitude of the focusing servo signal, the more is the disk wobbling.

It should be appreciated that no expensive sensors or the like are required for either eccentricity or wobble checks. All the means required for both checks are preexistent in CD-ROM drives of standard design, except perhaps the system controller which must be configured to carry out the disk check program according to the invention. The invention is therefore practicable in conventional CD-ROM drives with a minimum of structural alteration and cost increase.

The above and other objects, features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENT

Apparatus

Figure 1:
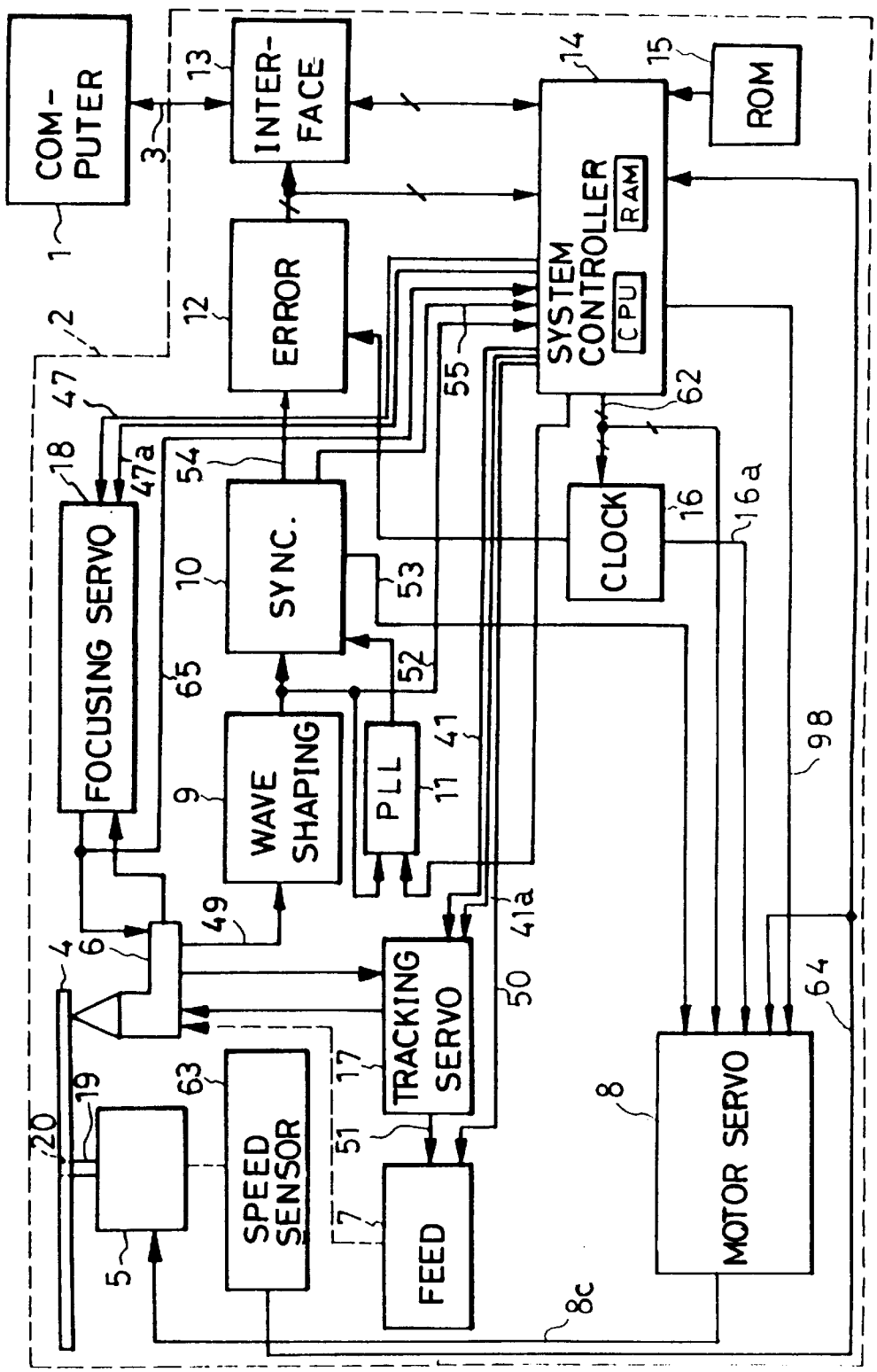
FIG. 1 is a block diagram of an example of CD-ROM drive constructed in accordance with the novel concepts of this invention, the CD-ROM drive being shown together with a computer with which it is incorporated.

The present invention is believed to be best embodied in the computer system diagramed in FIG. 1, which shows a computer 1 connected to a CD-ROM drive 2 by way of a bus 3. The CD-ROM drive 2 is shown loaded with a CD-ROM or optical data storage disk 4. The CD-ROM 4 will be hereinafter referred to simply as the disk, and the CD-ROM drive 2 as the disk drive. The disk 4 is shown disposed in position by receiving in its center hole 20 a drive spindle 19 shown as an armature shaft of an electric disk drive motor 5. As far as the present invention is concerned, the disk 4 is "loaded" in the disk drive 2 when it is on the drive spindle 19, as pictured in FIG. 1, and "unloaded" when it is moved out of engagement with the drive spindle.

Other primary components of the disk drive 2 include an optoelectric transducer or pickup 6, a transducer feed means 7, a disk drive motor servo circuit 8, a wave shaping circuit 9, a synchronization detector and demodulator circuit 10, a phase locked loop (PLL) circuit 11, an error detector and corrector circuit 12, an interface circuit 13, a system controller 14 in the form of a microprocessor with an external, programmable read-only memory (ROM) 15, a clock 16, a tracking servo circuit 17, and a focusing servo circuit 18. It is understood that the CD-ROM drive 2 is capable of data recovery at various speeds up to 12 times the standard audio CD speed in this particular embodiment.

Figure 2:
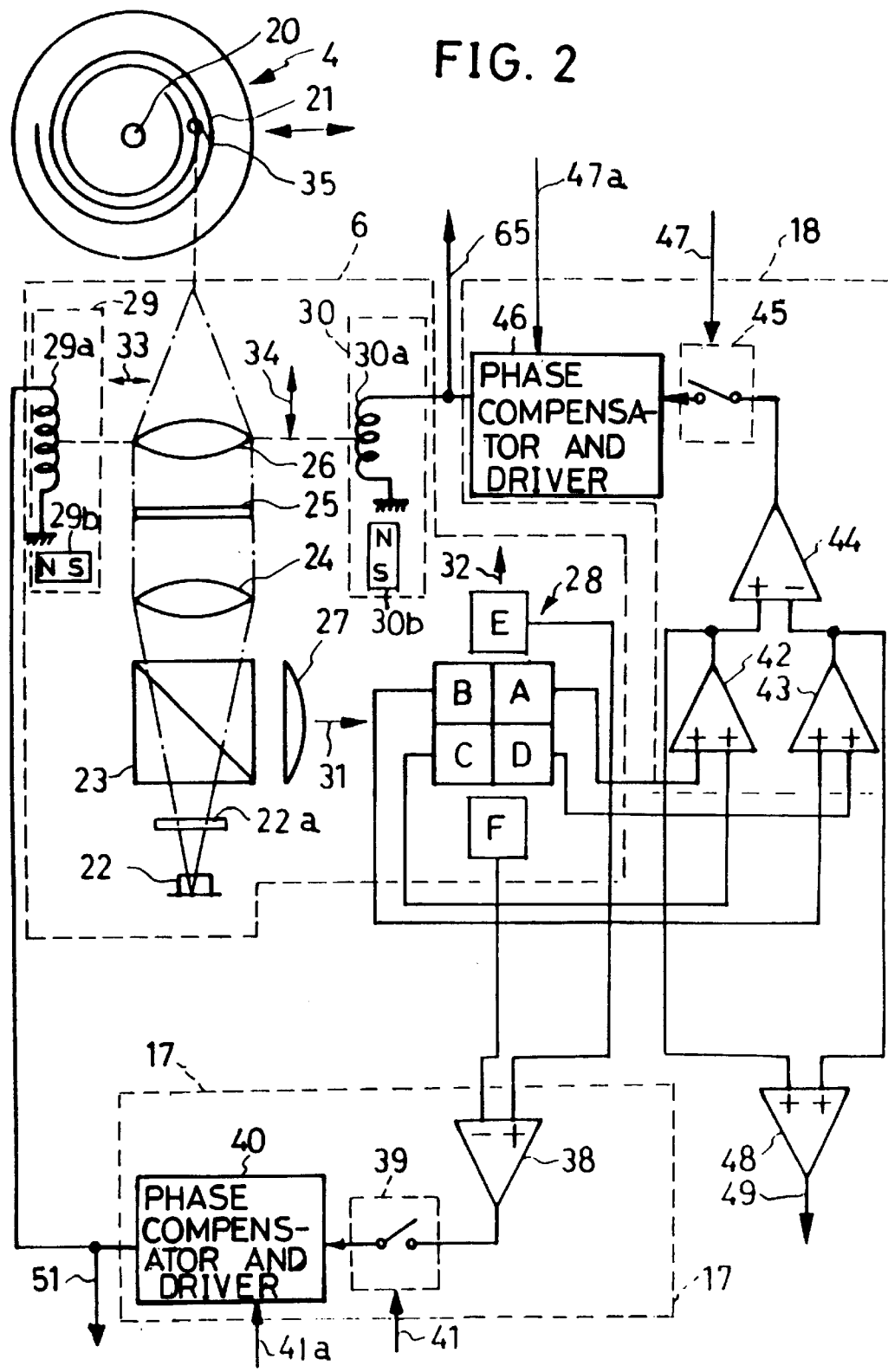
FIG. 2 is a schematic electrical diagram showing in more detail the transducer, tracking servo circuit, and focusing servo circuit of the FIG. 1 CD-ROM drive.

As depicted diagrammatically in FIG. 2, the disk 4 can be of the standard CD-ROM design having data prerecorded thereon in the form of optical pits along a multiturn spiral track 21 centered about the hole 20. The data is divided into a multiplicity of blocks each consisting of 2352 bytes, one byte being eight bits. Each data block is read in $1/75$ second when the disk is read at a standard speed. In CD-ROMs, as in audio CDs, data is recorded, and read, at constant linear velocity (CLV), rather than at constant angular velocity (CAV), so that the angular velocity of the disk 4 is increased as the disk track 21 is scanned radially outwardly by the transducer 6.

As shown in detail also in FIG. 2, the transducer 6 is of prior art construction having a light source such as a diode laser 22, a diffraction grating 22a, a beam splitter 23, a collimator lens 24 for providing parallel rays of light, a quarter wavelength plate 25, an objective lens 26, a semi-cylindrical lens 27 disposed on the path of the light that has been reflected back from the disk 4 and subsequently separated from the incident light by the beam splitter 23, a photodetector 28, a tracking actuator 29, and a focusing actuator 30.

Converged by the objective 26, the light from the laser 22 hits the surface of the disk 4. It is understood that in the illustrated transducer 6, the diffraction grating 22a creates a primary beam, used for both reading and focusing control, and two auxiliary beams for tracking control, although FIG. 2 shows only the primary beam spot on the disk 4 at 35. The unmodulated primary beam on hitting the disk surface will be modulated by the pattern of optical pits representative of data, and this modulated primary beam, as well as the reflected auxiliary beams, will be directed by the beam splitter 23 into the photodetector 28 via the semicylindrical lens 27.

Capable of translating the incident light into electric signals, the photodetector 28 is shown to have a closely packed group of four sections designated A, B, C and D, both for data recovery and for focusing control, and two other separate sections E and F for tracking control. The photodetector sections A and B, as well as the sections C and D, are divided along a line extending essentially tangentially of the disk track 21, as indicated by the arrow 32. The other two photodetector sections E and F are aligned in the direction of the arrow 32.

For maintaining the read beam spot 35 in centerline alignment with the disk track 21, the tracking actuator 29 conventionally comprises a moving coil 29a coupled to the objective 26, and a permanent magnet 29b. The objective 26 moves back and forth parallel to the disk surface, as indicated by the double headed arrow 33, in response to bidirectional current flow through the moving coil 29a. The tracking actuator 29 serves the additional purpose of jumping the beam spot to a desired track position during seek operations. Such spot jumping will take place as a jumping signal is applied from the system controller 14 to the tracking servo circuit 17.

The focusing actuator 30 is also shown as a voice coil actuator comprising a moving coil 30a coupled to the objective 26, and a permanent magnet 30b. The objective 26 moves back and forth perpendicular to the disk surface, as indicated by the double headed arrow 34, in response to bidirectional current flow through the moving coil 30a. The beams will thus be kept focused on the disk surface.

The noted two photodetector sections E and F are connected to the tracking servo circuit 17 and thence to the moving coil 29a of the tracking actuator 29. The tracking servo circuit 17 comprises a subtracter 38, an on-off switch 39, and a phase compensator and driver circuit 40. The subtracter 38 subtracts the output from the photodetector section F from the output from the photodetector section E. The resulting output from the subtracter 38 is a tracking control signal, which is applied via the switch 39 and phase compensator and driver circuit 40 to the moving coil 29a of the tracking actuator 29, thereby causing the objective 26 to move parallel to the disk surface to keep the read beam spot 35 in centerline alignment with the disk track 21.

The above described method of tracking control is per se not new in the art but has been known to the specialists as the three spots method. Another possible method is the differential phase detection, also conventional in the art, which dispenses with the diffraction grating 22a and the photodetector sections E and F.

The switch 39 is turned on and off by a signal supplied from the system controller 14, FIG. 1, over a line 41. The phase compensator and driver circuit 40 includes phase compensation filter means and gain control means, both not shown, which are controlled by a signal fed from the system controller 14 over a line 41a.

The other four photodetector sections A–D are all connected to a focusing servo circuit 18 and thence to the moving coil 30a of the focusing actuator 30. The focusing servo circuit 18 comprises two adders 42 and 43, a subtracter 44, a switch 45, and a phase compensator and driver circuit 46. The adder 42 adds the outputs from the photodetector sections A and C; and the other adder 43 the outputs from the photodetector sections B and D. The subtracter 44 subtracts the output from the adder 43 from the output from the adder 42. The resulting output from the subtracter 44 is a focusing control signal which is applied via the switch 45 and phase compensator and driver circuit 46 to the coil 30a of the focusing actuator 30. The objective 26 will thus be moved toward or away from the disk surface to keep the beams focused thereon.

This focusing method is known to the specialists as the astigmatic method. The switch 45 is operated by a signal supplied from the system controller 14 over a line 47, and the phase compensator and driver circuit 46 by a signal supplied from the system controller over a line 47a It is apparent, then, that the addition of all the outputs from the photodetector sections A–D provides a read signal representative of the 31 data read out from the disk 4. In the illustrated embodiment a two inputs adder 48 is provided for adding together the outputs from the two adders 42 and 43 of the focus servo circuit 18. The read signal thus obtained is sent over a line 49 to the wave shaping circuit 9, FIG. 1. In FIG. 2 all or some of the adders 42, 43, and 48 and subtracters 38 36 and 44 could be parts of the transducer 6.

With reference back to FIG. 1 the transducer 6 is moved radially of the disk 4 by the feed means 7 typically comprising an electric motor and means such as a lead screw or a rack and pinion mechanism for translating the bidirectional rotation of the motor into the linear reciprocation of the transducer 6. The feed means 7 have two functions: (1) to move the transducer 6 to desired track positions on the disk 4 in response to a seek command fed from the system controller 14 over a line 50; and (2) to enable the transducer to trace the spiral track on the disk in cooperation with the disk drive motor 5. For this latter function the feed means 7 detects the radial displacement of the beam spot 35 from the track 21 by directing into a low pass filter, not shown, the tracking control signal fed from the tracking servo circuit 17 over a line 51, and controls the radial travel of the transducer 6 accordingly.

The wave shaping circuit 9 amplifies the radio frequency read signal from the transducer 6 and reshapes it into a binary signal. It is understood that the disk 4 carries data encoded by the well known eight to fourteen modulation (EFM) method. The output from the wave shaping circuit 9 is therefore an EFM signal if the data is read correctly from the disk.

Additionally, the output pulses of the wave shaping circuit 9 are utilized according to the method of this invention for ascertaining the degree of eccentricity of each loaded disk. The tracking servo switch 39 is turned off, and the beam spot 35 is maintained at a constant distance from the drive spindle 19, for detection of disk eccentricity according to the invention. The wave shaping circuit 9 will then produce a pulse each time the beam spot crosses a track turn on the disk, the beam being then modulated by the data pits. The degree of disk eccentricity is proportional to the number of track turns crossed by the beam spot during one complete revolution of the disk. Thus the output pulses of the wave shaping circuit 9 are directly indicative of the degree of disk eccentricity during the operation of the disk drive 2 in disk eccentricity check mode.

The wave shaping circuit 9 is connected to both synchronization detector and demodulator circuit 10 and PLL circuit 11. The PLL circuit 11 provides clock pulses in synchronism with the bits of the EFM signal from the wave shaping circuit 9. The clock pulses put out by the PLL circuit 11 will be hereinafter referred to as the read clock pulses. The PLL circuit 11 has another input connected to the system controller 14 whereby the central frequency of a voltage controlled oscillator, not shown, included in the PLL circuit is changed.

The PLL circuit 11 has its output connected to the synchronization detector and demodulator circuit 10, which operates to determine whether the PLL circuit is locked, that is, whether it is operating in synchronism with the EFM signal. If it is, then, the circuit 10 will pass the read clock pulses from the PLL circuit 11 on to the disk drive motor servo circuit 8 by way of a line 53. Also, when the PLL circuit 11 is locked, the synchronization detector and demodulator circuit 10 will use the read clock pulses to demodulate the EFM signal into, for example, a digital non-return-to-zero (NRZ) signal, for delivery to the error detector and corrector circuit 12 over a line 54. The synchronization detector and demodulator circuit 10 performs the additional function of demodulating the recovered addresses of the data blocks on the disk 4, for delivery to the system controller 14 over a line 55. The system controller conventionally utilizes the addresses for causing the transducer 6 to be positioned over any desired data block on the disk 4.

The error detector and corrector circuit 12 detects errors, if any, in the incoming NRZ signal, corrects them if possible, and causes reading to be retried if correction is impossible. The output of the error detector and corrector circuit 12 is connected to both interface circuit 13 and system controller 14. The interface circuit 13 is connected to the computer 1 by way of the bus 3 and to the system controller 14.

The clock 16 is connected to the system controller 14 by way of a bus 62, to the motor servo circuit 8 by way of a line 16a, and to the error detector and corrector circuit 12. As the system controller 14 puts out speed data indicative of one of several predetermined speeds at which the disk drive motor 5 is to be driven, the clock 16 responds by generate pulses at a corresponding one of a predetermined minimum repetition rate, and two, four, and eight times the minimum repetition rate. The pulses produced by the clock 16 will be referred to as the true clock pulses in contradistinction from the read clock pulses put out by the PLL circuit 11. The true clock pulses are delivered to the motor servo circuit 8 and to the error detector and corrector circuit 12.

The motor servo circuit 8 has inputs connected to the synchronization detector and demodulator circuit 10 by way of the read clock pulse line 53, to the system controller 14 by way of the speed data bus 62 and a CAV/CLV control line 98, to the clock 16 by way of the line 16a, and to a motor speed sensor 63 by way of a line 64. The output line 8c of the motor servo circuit 8 is connected to the disk drive motor 5.

Figure 3:
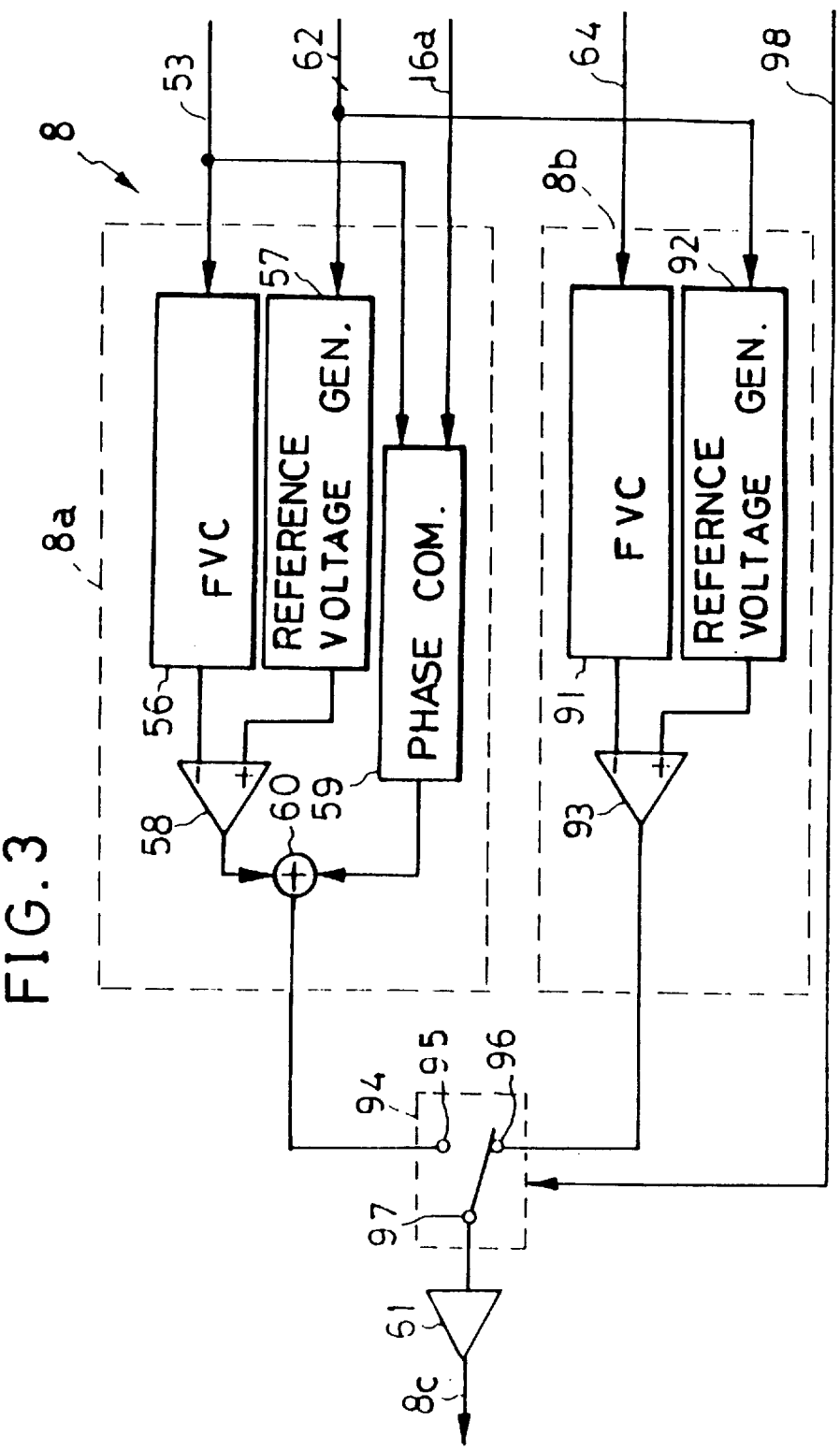
FIG. 3 is a schematic electrical diagram showing in more detail the disk drive motor servo circuit included in the FIG. 1 CD-ROM drive.

As illustrated in detail in FIG. 3, the motor servo circuit 8 comprises both CLV servo circuit 8a and CAV servo circuit 8b for CLV and CAV controls, respectively, of the disk drive motor 5. The CLV servo circuit 8a includes a frequency to voltage converter (FVC) 56 having an input connected to the read clock pulse line 53 for converting the repetition rate of the read clock pulses into an equivalent voltage signal. The output of the FVC 56 is connected to one input of a differential amplifier 58.

Connected to another input of the differential amplifier 58 is a reference voltage generator 57 which puts out a selected one of four different reference voltages corresponding to a predetermined minimum disk rotation speed, which in this particular embodiment is the standard audio CD speed, and two, four, and eight times that speed, in response to the speed data sent from the system controller 14 by way of the bus 62. Thus the differential amplifier 58 puts out what may be termed a repetition rate error signal, which is a voltage signal indicative of the difference between the selected reference voltage and the FVC output voltage representative of the read clock pulse rate.

A further member of the CLV servo circuit 8a is a phase comparator 59 having an input connected to the read clock pulse line 53, and another to the true clock pulse line 16a The output from the phase comparator 59 may therefore be termed a phase error signal, being indicative of the phase departure of the read clock pulses from the true clock pulses.

The differential amplifier 58 and the phase comparator 59 are both connected to an adder 60, an additional component of the CLV circuit 8a. The output from the adder 60 is the sum of the repetition rate error signal and the phase error signal. This output from the adder 60 is therefore called a total error signal.

The CAV servo circuit 8b, on the other hand, has an FVC 91 and a reference voltage generator 92, both connected to the inputs of a differential amplifier 93. Connected to the output line 64 of the motor speed sensor 63, the FVC 91 provides a voltage proportional to the repetition rate of the motor speed pulses, that if, to the rotational speed of the disk drive motor 5. Like its counterpart in the CLV servo circuit 8a, the reference voltage generator 92 has its input connected to the speed data bus 62 for inputting the speed data from the system controller 14 and for itself putting out a reference voltage corresponding to the specified motor speed. The differential amplifier 93 provides a voltage corresponding to the difference between the outputs from the FVC 91 and the reference voltage generator 92.

The motor servo circuit 8 is further provided with a selector switch 94 for selectively putting out the CLV and the CAV control signals produced by the circuits 8a and 8b. The selector switch 94 is shown to comprise a fixed contact 95 connected to the adder 60, another fixed contact 96 connected to the differential amplifier 93, and a movable contact 97 connected to a drive amplifier 61 and thence to the disk drive motor 5, FIG. 1, by way of the line 8c. The movable contact 97 is engageable with either of the two fixed contacts 95 and 96 under the direction of a CAV/CLV select signal sent from the system controller 14 over the line 98.

With reference back to FIG. 1 the motor speed sensor 63 is mechanically or optically coupled to the disk drive motor 5 for generating pulses at a rate proportional to the rotational speed of the motor and hence of the disk 4. Six motor speed pulses are generated with each complete motor revolution in this particular embodiment. The motor speed pulses are essential for the CAV servo control of the motor 5 and also play a secondary role in the measurement of disk eccentricity according to the invention.

FIG. 1 indicates a line 65 whereby the output of the focusing servo circuit 18 is connected to the system controller 14. As will be better understood from FIG. 2, the line 65 is intended for the delivery to the system controller 14 of the focusing servo signal, or the voltage signal being applied from the phase compensator and driver circuit 46 to the moving coil 30a of the focusing actuator 30. The system controller 14 relies on this focusing coil voltage for measuring the degree of wobbling of the disk 4 according to the method of this invention, as will be detailed presently.

The system controller 14 can take the form of a microprocessor of largely conventional design comprising a central processor unit (CPU) and a random access memory (RAM). The ROM 15 is factory preprogrammed to cause the system controller 14, and the complete disk drive 2, to operate automatically according to the disk check program embodying the method of this invention. The disk check program dictates a sequence of steps to be followed for determining a read speed matching each loaded disk according to its eccentricity or degree of wobbling . . .

Figure 4:
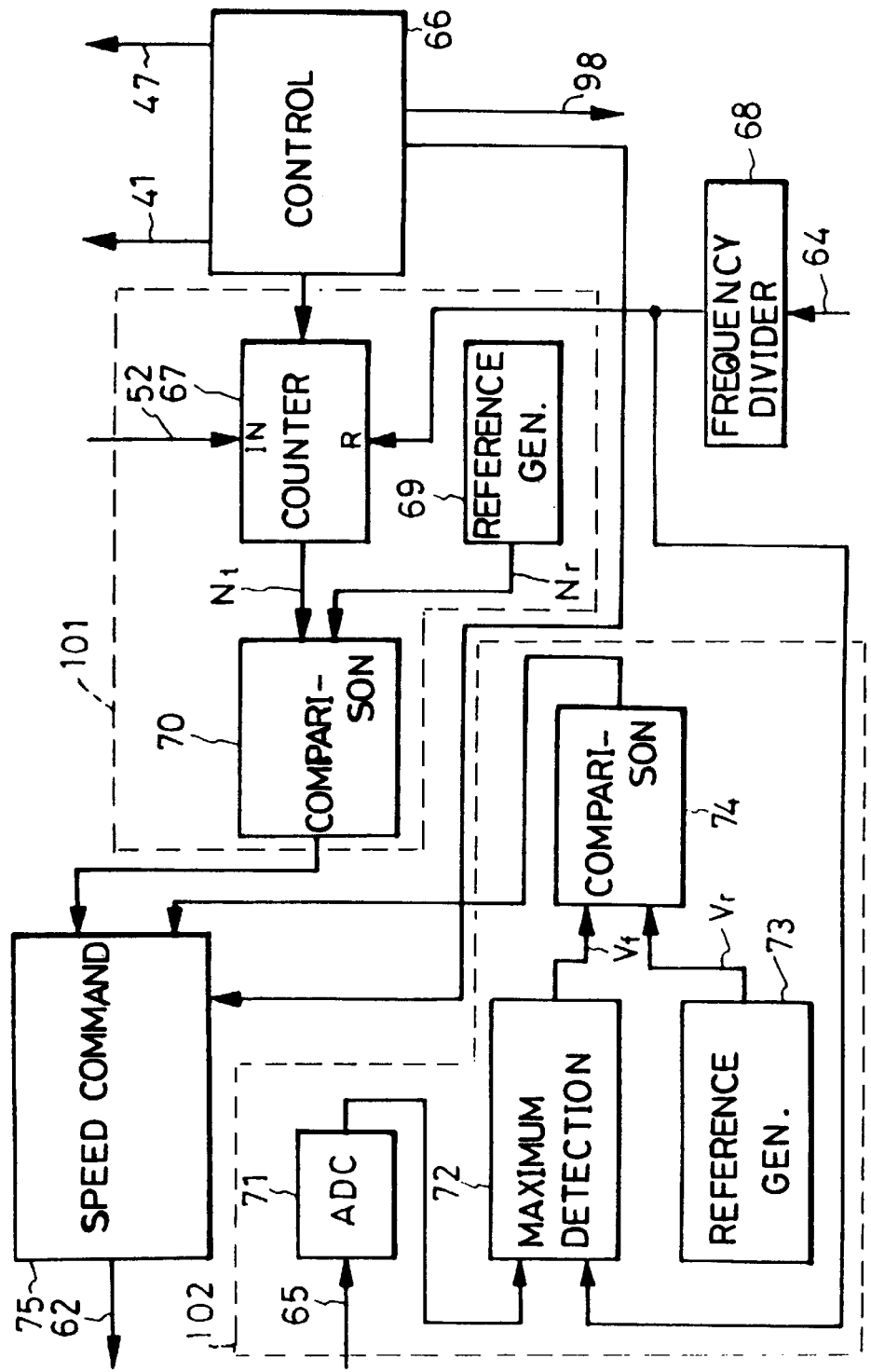
FIG. 4 is an equivalent block diagram of the system controller included in the FIG. 1 CD-ROM drive, showing in particular means possessed by the system controller in regard to the implementation of the disk check method according to the present invention.

Block diagrammatically illustrated in FIG. 4 are some of the means that may be considered equivalently included in the system controller 14 for performing the disk check program according to the invention. Such means include a control means 66, eccentricity check means 101, wobble check means 102, and a motor speed command means 75.

The control means 66 generates various signals for setting the disk drive 2 in either eccentricity check mode, wobble check mode, and read mode, as well as for various other control functions hereinafter made apparent. For eccentricity check mode the control means 66 will supply signals for turning on the focusing servo and the motor servo, for turning off the tracking servo, and for operating the eccentricity check means 101. For wobble check mode the control means 66 will supply signals for turning on all of the focusing servo, tracking servo, and motor servo. The control means 66 will also deliver a CAV/CLV select signal to the selector switch 94, FIG. 3, of the motor servo circuit 8.

The eccentricity check means 101 include a counter 67, a reference generating means 69, and a comparison means 70. Reset by each pulse from a frequency divider 68 connected to the output line 64 of the motor speed sensor 63, FIG. 1, the counter 67 counts the pulses sent from the wave shaping circuit 9 over the line 52. The frequency divider 68 divides the repetition frequency of the motor speed pulses into one sixth. Since the motor speed sensor 63 produces six pulses during each complete revolution of the motor 5, as has been stated, the frequency divider 68 puts out one pulse with each complete disk revolution. Thus the counter 67 counts the pulses from the wave shaping circuit 9 during each complete disk revolution.

It will now be explained why disk eccentricity is measurable in terms of the number of pulses put out by the wave shaping circuit 9 per unit length of time. In eccentricity check mode the beam spot 35, FIG. 2, on the disk 4 is maintained at a constant distance from the axis of disk rotation because then the tracking servo is off, and the transducer feed means 7 out of operation. The wave shaping circuit 9 will then put out a pulse only when the beam spot crosses a track turn. The beam spot will cross the track only once during one complete disk revolution if the disk has no eccentricity, with its center hole cut exactly centrally therein. If the disk is eccentric, however, the beam spot will cross the track two or more times during one complete disk revolution. The number of times the beam spot crosses the track, and therefore the number of pulses put out by the wave shaping circuit 9, per disk revolution by the number of times proportional to the degree of disk eccentricity are proportional to the degree of disk eccentricity.

In accordance with the above discussed manner of disk eccentricity evaluation, the comparison means 70 of the eccentricity check means 101 compares the variable pulse number $N_t$ from the counter 67 and a predetermined reference number $N_r$ from the reference generating means 69. The reference number $N_r$ represents the maximum allowable number of times (i.e. the maximum allowable disk eccentricity) the beam spot is allowed to cross the track at the maximum disk speed (i.e. the disk speed when the beam spot is tracing the inmost track turn) when the disk is being driven at a prescribed CLV. The comparison means 70 will produce a signal indicative of whether the variable number $N_t$ is greater than the reference number $N_r$ or not, that is, whether the eccentricity of the disk is more than the allowable limit or not. The disk is judged to be of poor quality if its eccentricity is more than the allowable limit, so that the disk is read at a reduced speed according to the method of the invention. The output from the comparison means 70 is directed into the speed command means 75 in order to cause, as required, the desired reduction in motor speed in subsequently reading the disk.

The wobble check means 102, on the other hand, comprise an analog to digital converter (ADC) 71, a maximum detection means 72, a reference generating means 73 and a comparison means 74. Connected to the line 65, the ADC 71 digitizes the focusing servo signal being applied from the focusing servo circuit 18, FIGS. 1 and 2, to the moving coil 30a of the focusing actuator 30 during wobble check mode operation. The maximum detection means 72 has an input connected to the ADC 71 and another to the frequency divider 68 for detecting the maximum amplitude $V_f$ of the ADC output, or the focusing servo signal, during each complete revolution of the disk 4.

Before proceeding to the description of the reference generating means 73 and the comparison means 74, it will be described how the degree of disk wobbling is sensed according to the invention, with reference directed mostly to FIG. 2. Generally, the degree of disk wobbling may be ascertained from either the positive peaks, negative peaks, or the difference between the positive and negative peaks, of the focusing servo signal. No refocusing of the read beam will be necessary if the beam is already focused on a disk that is absolutely free from wobbling and, at the same time, if the objective 26 is fixed in its position in the direction of the beam axis. The focusing servo signal will then be zero volt. In the event of disk wobbling, however, due to the buckling or other defects of the disk, then the read beam will defocus. Sensing this beam defocusing from the outputs from the four sections A–D of the photodetector 28, the focusing servo circuit 18 will compensate for it by causing the focusing servo signal to go either positive or negative.

It is thus seen that disk wobbling is detectable from the magnitude of the focusing servo signal. Such detection is made in this particular embodiment in terms of the maximum amplitude, or maximum difference between the positive and negative peaks, of the focusing servo signal during one complete disk revolution.

With reference back to FIG. 4 the reference generating means 73 of the wobble check means 102 provides a reference value $V_r$ which represents the amplitude of the focusing servo signal when the disk wobbles to an allowable limit while being driven at a predetermined speed of, say, eight times the standard audio CD speed.

Comparing the two inputs $V_f$ and $V_r$, the comparison means 74 provide a signal indicative of whether the wobbling of the disk is more than the allowable limit or not. The disk is judged to be of poor quality if it is found wobbling beyond the limit. The output of the comparison means 74 is connected to the speed command means 75 in order to cause, as required, a reduction in motor speed for reading the poor quality disk.

METHOD

Figure 5:
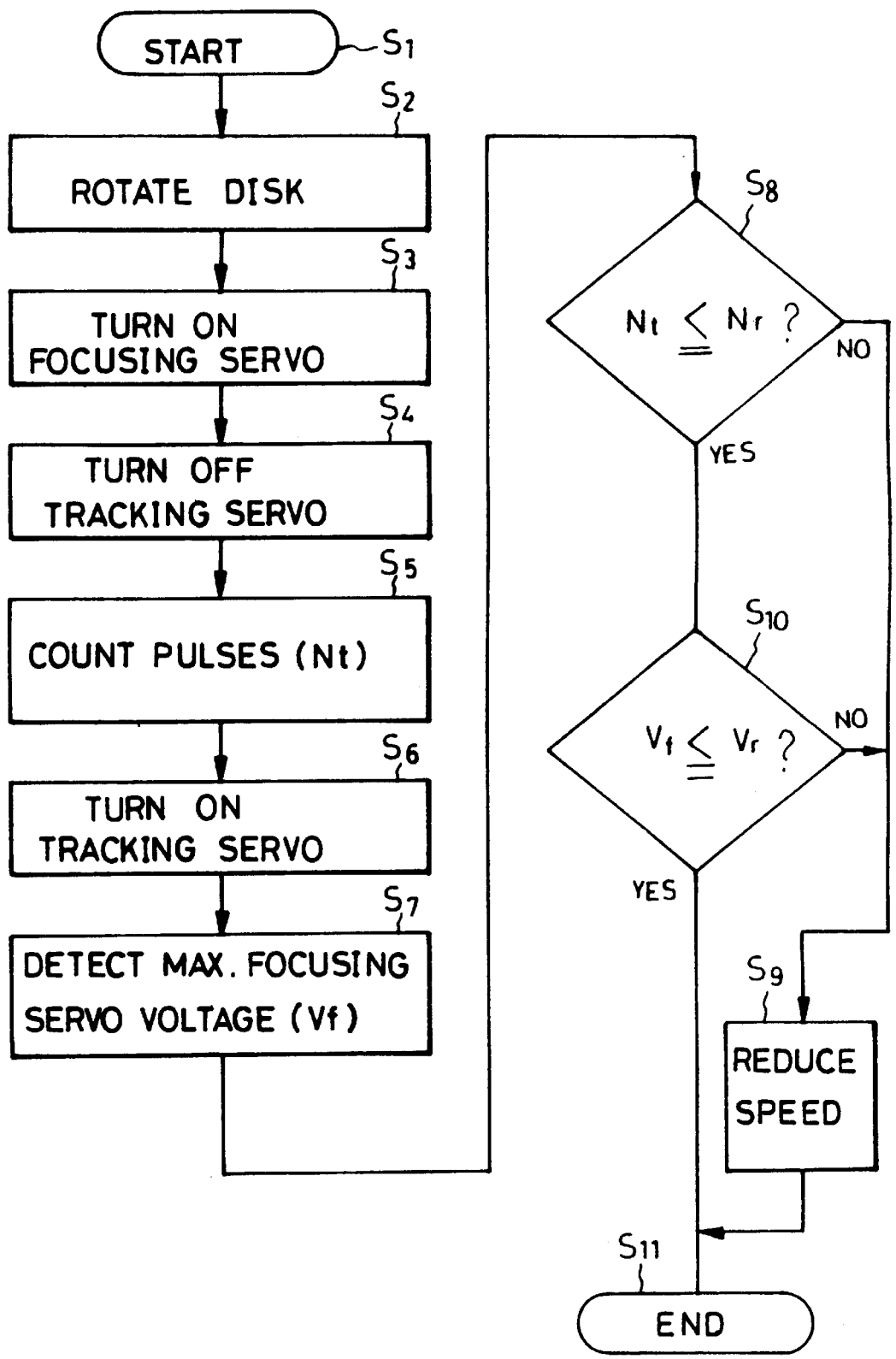
FIG. 5 is a flow chart of the disk check program according to the present invention, to be practiced in the FIG. 1 CD-ROM drive.

Reference is now directed to the flowchart of FIG. 5 for a discussion of the disk check program stored on the ROM 15 according to the method of the present invention. Following the start of the disk check program at $S_1$, the motor is set into rotation at a first predetermined speed, which is eight times the standard audio CD speed in this particular embodiment, according to a block $S_2$. For such motor rotation the system controller 14 will produce from its speed command means 75, FIG. 4, the speed data indicative of the first predetermined speed, and from its control means 66 the CLV/CAV select signal for connecting the CAV servo circuit 8b, FIG. 3, to the drive amplifier 61. Further the beam spot 36 is positioned on the radially inmost turn of the track 21 on the disk 4.

The next block $S_3$ dictates the closure of the focusing servo switch 45, FIG. 2, by a signal sent from the system controller control means 66 over the line 47. The tracking servo switch 39 is turned off after the motor 5 has sufficiently picked up speed, according to a block $S_4$. Then the track turns subsequently crossed by the beam spot are counted by the counter 67, FIG. 4, of the system controller eccentricity check means 101, and the resulting count $N_t$ is stored on the system controller RAM, according to a block $S_5$.

Then the tracking servo switch 39 is closed according to a block $S_6$ for wobble check. The motor speed at this juncture is such that the inmost track turn on the disk is scanned at the first predetermined speed. The feed means 7 is left inactivated so that the transducer 6 repeatedly scans the inmost track turn.

The next block $S_7$ indicates the measurement of maximum amplitude of the focusing servo voltage $V_f$ being applied from the focusing servo circuit 18 to the servo actuator coil 30a during one complete revolution of the disk. The detected maximum amplitude $V_f$ is stored on the system controller RAM.

Then comes a node $S_8$ which asks whether the number $N_t$ of track turns counted at the block $S_5$ is equal to or less than the reference number $N_r$ from the reference generating means which represents the allowable limit of track turns to be crossed. If the answer is no, that is, if the count $N_t$ is greater than the limit $N_r$, then the disk is of poor quality, being too eccentric, and so must be read at a lower speed, as indicated by a block $S_9$. In this particular embodiment the motor speed is dropped from eight to four times the standard audio CD speed. Then the selector switch 94, FIG. 3, is actuated to drive the motor at CLV of four times the standard audio CD speed for reading.

If the answer to the node $S_8$ is yes, on the other hand, then the disk may, or may not, be of good quality. Another anode $S_{10}$ is then encountered which asks whether the maximum amplitude $V_f$ of the focusing servo signal, detected at the block $S_7$, is equal to or less than the reference value $V_r$ which represents the allowable limit of focusing servo voltages. If the answer is no, the disk is of poor quality, even though the eccentricity check of the disk indicated that it was not so. The motor speed is therefore reduced to four times the standard audio CD speed according to the block $S_9$, and the disk is read at CLV as the program comes to an end at $S_{11}$.

The answer "yes" to the node $S_{10}$ brings the program to an immediate end at $S_{11}$. The disk is of good quality, having cleared both eccentricity and wobble checks, and so is read at eight times the standard audio CD speed.

As an incidental feature of the present invention, the answers "no" to the nodes $S_8$ and $S_{10}$ and the answer "yes" to the node $S_{10}$ are held, as on the RAM of the system controller 14, until the disk 4 is unloaded. Each loaded disk is therefore required to undergo the disk check program only once. The disk will thereafter be read at the same speed determined as above no matter how many times it is accessed.

Figure 6:
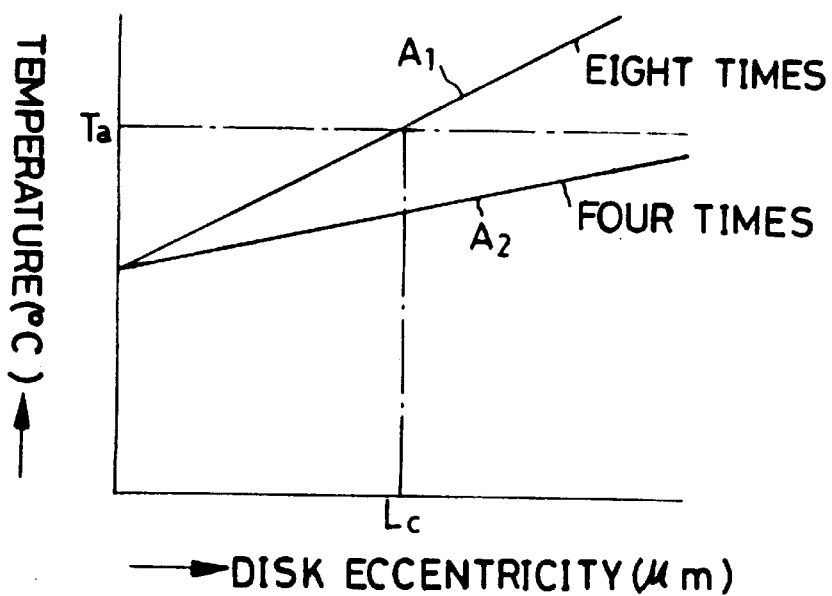
FIG. 6 is a graph showing relations between the degree of disk eccentricity and the temperature of the tracking actuator coil.
Figure 7:
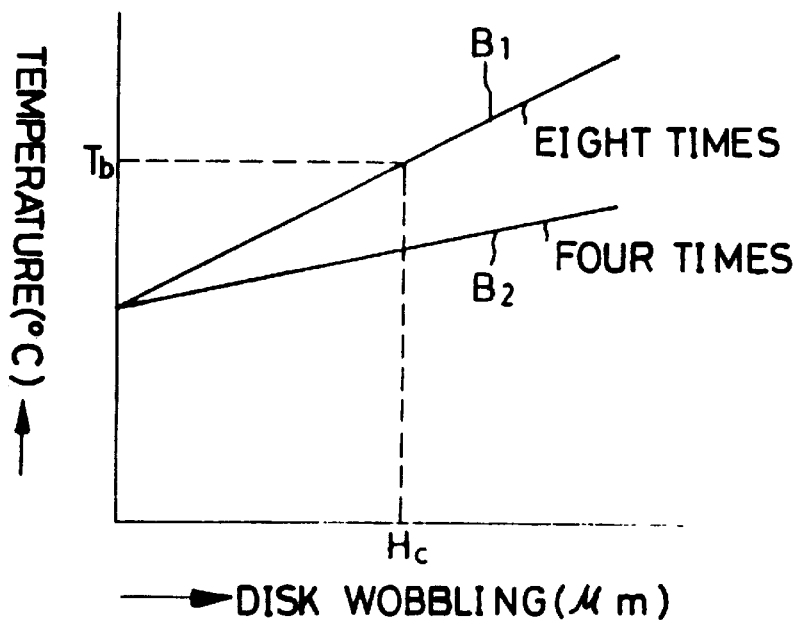
FIG. 7 is a graph showing relations between disk wobbling and the temperature of the focusing actuator coil.

Just how effective such reduced speed reading of poor quality disks is will become apparent from the following explanation of FIGS. 6 and 7. The curves $A_1$ and $A_2$ in FIG. 6 represent the relations between disk eccentricity and the temperature of the coil 29a of the tracking actuator 29 when the inmost track turn is traced by the read beam at eight and four times the standard audio CD speed, respectively. Even though the disk eccentricity is the same at $L_a$ for both curves, the coil temperature is significantly higher when the disk is driven at the higher speed than when it is at the lower speed. Let $T_a$ be the maximum allowable coil temperature. If disk eccentricity if more than $L_a$ the coil temperature will not exceed the limit $T_a$ when the disk is driven at four, rather than eight, times the standard audio CD speed.

The curves $B_1$ and $B_2$ in FIG. 7 represent the relations between the degree of disk wobbling and the temperature of the coil 30a of the focusing actuator 30 when the inmost tack turn is traced by the read beam at eight and four times the standard audio CD speed, respectively. The focusing coil temperature reaches the maximum allowable value $T_b$ at the wobbling degree $H_c$ when the disk is driven at eight times the standard audio CD speed, but is less than $T_b$ when the disk is driven at four times the standard audio CD speed. It can therefore be stated that even for wobbling disks, the focusing coil temperature can be maintained in a safe range driving them at the reduced speed.

Notwithstanding the foregoing detailed disclosure it is not desired that the present invention be limited by the exact showing of the drawings or the description thereof; rather, the invention should be construed broadly and in a manner consistent with the fair meaning or proper scope of the attached claims. The following is a brief list of possible modifications of the illustrated embodiment which are all believed to fall within the scope of the invention:

1. The quality of the loaded disk could be checked in terms of only either of disk eccentricity and wobbling, instead of both as in the illustrated embodiment.
2. Both eccentricity check means 101 and wobble check means 102, FIG. 4, could be external to the system controller 14, either in part or in whole.
3. The CAV servo circuit 8b, FIG. 3, could be omitted.
4. The photodetector 28 could be split into two sections instead of six as in the illustrated embodiment.
5. The invention could be applied to devices for CAV servo reading of CAV disks, and CAV reading of CLV disks.

What is claimed is:

1. In an apparatus for data recovery from rotating data storage disks of varying physical qualities, a method comprising the steps of:
   (a) rotating a data storage disk at a first predetermined speed;
   (b) ascertaining whether at least either of the eccentricity and wobbling of the disk is more than a prescribed limit or not while the disk is in rotation at the first predetermined speed;
   (c) reading the disk at the first predetermined speed if said at least either of the eccentricity and wobbling of the disk is found to be not more than the prescribed limit at step (b); and
   (d) reading the disk at a second predetermined speed, which is less than the first predetermined speed, if said at least either of the eccentricity and wobbling of the disk is found to be more than the prescribed limit at step (b).

2. The method of claim 1 wherein the apparatus includes a transducer for reading data recorded on the disk along a multiturn track by irradiating the disk with a beam of light, and wherein the eccentricity of the disk is measured in terms of the number of pulses produced by the transducer per unit length of time, the transducer producing each such pulse each time the spot of the beam on the disk crosses a track turn.

3. The method of claim 1 wherein the apparatus includes a transducer for reading data recorded on the disk along a multiturn track by irradiating the disk with a beam of light, and a focusing servo for keeping the beam focused on the disk, the focusing servo including a focusing servo circuit for applying a focusing servo signal to a focusing actuator, and wherein the wobbling of the disk is measured in terms of the maximum magnitude of the focusing servo signal during a unit length of time.

4. The method of claim 1 wherein the findings as to whether said at least either of the eccentricity and wobbling of the disk is more than the prescribed limit or not are held until the disk is withdrawn from the apparatus, in order that the disk may be read at the same speed as long as the disk stays loaded in the apparatus, no matter how many times the disk is accessed.

5. In an apparatus for data recovery from rotating data storage disks of varying physical qualities, the apparatus having a transducer for reading a disk by irradiating the same with a beam of light, a tracking servo for holding the spot of the beam on the disk in alignment with a multiturn data track thereon, and a focusing servo for holding the beam focused on the disk, the focusing servo including a focusing servo circuit for applying a focusing servo signal to a focusing actuator, a method comprising the steps of:

(a) rotating a data storage disk at a first predetermined speed;

(b) turning the focusing servo on;

(c) turning the tracking servo off;

(d) counting pulses produced by the transducer per unit length of time, the transducer producing each such pulse each time the beam spot crosses a track turn;

(e) comparing the count of step (d) with a predetermined number in order to ascertain whether the eccentricity of the disk is more than a prescribed limit or not;

(f) reading the disk at the first predetermined speed if the eccentricity of the disk is found to be not more than the prescribed limit at step (e); and (g) reading the disk at a second predetermined speed, which is less than the first predetermined speed, if the eccentricity of the disk is found to be more than the prescribed limit at step (e).

6. In an apparatus for data recovery from rotating data storage disks of varying physical qualities, the apparatus having a transducer for reading a disk by irradiating the same with a beam of light, a tracking servo for holding the spot of the beam on the disk in alignment with a multiturn data track thereon, and a focusing servo for holding the beam focused on the disk, the focusing servo including a focusing servo circuit for applying a focusing servo signal to a focusing actuator, a method comprising the steps of:

(a) rotating a data storage disk at a first predetermined speed;

(b) turning the focusing servo on;

(c) turning the tracking servo on;

(d) measuring the maximum magnitude of the focusing servo voltage during a unit length of time;

(e) comparing the maximum magnitude of the focusing servo voltage with a predetermined value in order to ascertain whether the wobbling of the disk is more than a prescribed limit or not;

(f) reading the disk at the first predetermined speed if the wobbling of the disk is found to be not more than the prescribed limit at step (e); and (g) reading the disk at a second predetermined speed, which is less than the first predetermined speed, if the wobbling of the disk is found to be more than the prescribed limit at step (e).

7. In an apparatus for data recovery from rotating data storage disks of varying physical qualities, the apparatus having a transducer for reading a disk by irradiating the same with a beam of light, a tracking servo for holding the spot of the beam on the disk in alignment with a multiturn data track thereon, and a focusing servo for holding the beam focused on the disk, the focusing servo including a focusing servo circuit for applying a focusing servo signal to a focusing actuator, a method comprising the steps of:

(a) rotating a data storage disk at a first predetermined speed;

(b) turning the focusing servo on;

(c) turning the tracking servo off;

(d) counting pulses produced by the transducer per unit length of time, the transducer producing each such pulse each time the beam spot crosses a track turn;

(e) turning the tracking servo on;

(f) measuring the maximum magnitude of the focusing servo voltage during a unit length of time;

(g) comparing the count of step (d) with a predetermined number in order to ascertain whether the eccentricity of the disk is more than a prescribed limit or not;

(h) reading the disk at a second predetermined speed, which is less than the first predetermined speed, if the eccentricity of the disk is found to be more than the prescribed limit at step (g);

(i) comparing the maximum magnitude of the focusing servo voltage, measured at step (f), with a predetermined value in order to ascertain whether the wobbling of the disk is more than a prescribed limit or not, if the eccentricity of the disk is found to be not more than the prescribed limit at step (g);

(j) reading the disk at the first predetermined speed if the wobbling of the disk is found to be not more than the prescribed limit at step (i); and (k) reading the disk at a second predetermined speed, which is less than the first predetermined speed, if the wobbling of the disk is found to be more than the prescribed limit at step (i).

8. An apparatus for data recovery from rotating data storage disks of varying physical qualities, wherein the improvement resides in the combination of:

(a) drive means for imparting multiple speed rotation to a data storage disk;

(b) speed command means connected to the drive means for causing the same to rotate the disk at either of a first and a second predetermined speed, the first predetermined speed being higher than the second; and (c) disk check means for ascertaining whether at least either of the eccentricity and wobbling of the disk is more than a prescribed limit or not while the disk is in rotation at the first predetermined speed, the disk check means being connected to the speed command means for causing the disk to be read at the first predetermined speed if said at least either of the eccentricity and wobbling of the disk is found to be not more than the prescribed limit, and at the second predetermined speed if said at least either of the eccentricity and wobbling of the disk is found to be more than the prescribed limit.

9. The apparatus of claim 8 wherein the apparatus includes a transducer for reading data recorded on the disk along a multiturn track by irradiating the disk with a beam of light, and wherein the disk check means are disk eccentricity check means comprising:

(a) a counter for counting pulses produced by the transducer during a unit length of time, the transducer producing each such pulse each time the spot of the beam on the disk crosses a track turn;

(b) reference generating means for generating a signal indicative of a reference number which represents a number of pulses to be produced by the transducer during the unit length of time when the disk has a maximum allowable degree of eccentricity; and (c) comparison means for comparing the count of the counter with the reference number.

10. The apparatus of claim 9 wherein the drive means include a drive motor, and wherein the apparatus further comprises:

(a) a motor speed sensor coupled to the drive motor for producing a signal indicative of the speed of rotation thereof; and (b) a frequency divider connected between the motor speed sensor and the counter for causing the latter to count the pulses produced by the transducer during each complete revolution of the motor.

11. The apparatus of claim 8 wherein the apparatus includes a transducer for reading data recorded n the disk along a multiturn track by irradiating the disk with a beam of light, and a focusing servo for keeping the beam focused on the disk, the focusing servo including a focusing servo circuit for applying a focusing signal to a focusing actuator, and wherein the disk check means are disk wobbling check means comprising:

(a) maximum detection means connected to the focusing servo circuit for detecting the maximum magnitude of the focusing servo signal during a unit length of time;

(b) reference generating means for generating a signal indicative of a reference value which represents the magnitude of the focusing servo signal when the disk wobbles to a maximum allowable degree on being driven at the first predetermined speed;

(c) comparison means for comparing the detected maximum magnitude of the focusing servo signal with the reference value.

12. The apparatus of claim 11 wherein the drive means include a drive motor, and wherein the apparatus further comprises:

(a) a motor speed sensor coupled to the drive motor for producing a signal indicative of the speed of rotation thereof; and (b) a frequency divider connected between the motor speed sensor and the maximum detection means for causing the latter to detect the maximum magnitude of the focusing servo signal during each complete revolution of the motor.

13. An apparatus for data recovery from rotating data storage disks of varying physical qualities, each disk having data prerecorded thereon along a multiturn track, wherein the improvement resides in the combination of:

(a) drive means for imparting multiple speed rotation to a data storage disk;

(b) a transducer for reading the rotating disk by irradiating the same with a beam of light;

(c) a tracking servo for holding the spot of the beam on the disk in alignment with the multiturn data track thereon;

(d) a focusing servo for holding the beam focused on the disk, the focusing servo including a focusing servo circuit for producing a focusing servo signal, and a focusing actuator activated by the focusing servo signal;

(e) speed command means connected to the drive means for causing the same to rotate the disk at either of a first and a second predetermined speed, the first predetermined speed being higher than the second; and (f) disk eccentricity check means connected to the transducer for ascertaining the eccentricity of the disk in terms of a number of pulses produced by the transducer as the beam spot crosses track turns on the disk, the disk eccentricity check means being also connected to the speed command means for causing the disk to be read at the first predetermined speed if the eccentricity of the disk is found to be not more than a prescribed limit, and at the second predetermined speed if the eccentricity of the disk is found to be more than the prescribed limit;

(g) disk wobbling check means connected to the focusing servo for ascertaining the wobbling of the disk in terms of the magnitude of the focusing servo signal, the disk wobbling check means being also connected to the speed command means for causing the disk to be read at the first predetermined speed if the wobbling of the disk is found to be not more than a prescribed limit, and at the second predetermined speed if the wobbling of the disk is found to be more than the prescribed limit.

14. The apparatus of claim 13 further comprising control means for holding the focusing servo in operation, and the tracking servo out of operation, during the operation of the disk eccentricity check means, and for holding both focusing servo and tracking servo in operation during the operation of the disk wobbling check means.

* * * * *